United States Patent [19]

Johnson et al.

[11] Patent Number: 4,640,964

[45] Date of Patent: Feb. 3, 1987

[54] OLEFIN POLYMERIZATION WITH POLYPHOSPHATE SUPPORTED CHROMIUM CATALYSTS

[75] Inventors: Marvin M. Johnson; Max P. McDaniel, both of Bartlesville, Okla.

[73] Assignee: Phillips Petroleum Company, Bartlesville, Okla.

[21] Appl. No.: 741,514

[22] Filed: Jun. 5, 1985

Related U.S. Application Data

[62] Division of Ser. No. 626,944, Jul. 2, 1984, Pat. No. 4,547,479.

[51] Int. Cl.$^4$ .............................. C08F 4/24; C08F 4/78
[52] U.S. Cl. ..................................... 526/134; 526/105; 526/106; 526/138; 526/145; 526/154; 526/156
[58] Field of Search ............... 526/105, 106, 134, 138, 526/145, 154, 156

[56] References Cited

U.S. PATENT DOCUMENTS

| | | |
|---|---|---|
| 2,773,921 | 12/1956 | Rylander, Jr. et al. ........ 260/683.15 |
| 2,921,081 | 1/1960 | Zimmerschied et al. ............ 260/329 |
| 4,147,758 | 4/1979 | Adrian et al. ........................ 423/315 |
| 4,364,841 | 12/1982 | McDaniel et al. ................... 252/430 |
| 4,364,842 | 12/1982 | McDaniel et al. ................... 252/430 |
| 4,397,765 | 8/1983 | McDaniel ............................. 526/156 |

*Primary Examiner*—Edward J. Smith
*Attorney, Agent, or Firm*—A. L. Robbins

[57] ABSTRACT

A catalyst support based on aluminum polyphosphate or polyphosphoric acid-impregnated alumina is provided by two alternative techniques. In the first embodiment, an aluminum polyphosphate composition is heated in a dry atmosphere and thereafter impregnated with a zerovalent chromium component under anhydrous conditions. The resulting catalyst is active for olefin polymerization. In the second embodiment, alumina is impregnated with a polyphosphoric acid composition. This resulting polyphosphoric acid impregnated alumina can be used as a support for zerovalent chromium or can be impregnated with a chromium component and oxidized to give an active hexavalent chromium species. The resulting catalysts are advantageous because of their unusual sensitivity to hydrogen thus allowing great leeway in molecular weight control.

12 Claims, No Drawings

OLEFIN POLYMERIZATION WITH POLYPHOSPHATE SUPPORTED CHROMIUM CATALYSTS

CROSS REFERENCE TO RELATED APPLICATIONS

This is a divisional application of copending application Ser. No. 626,944, filed July 2, 1984, now U.S. Pat. No. 4,547,479.

BACKGROUND OF THE INVENTION

This invention relates to a phosphate supported chromium catalyst for olefin polymerization.

It has long been known to use supported chromium catalysts for olefin polymerization in either hydrocarbon solution or in a slurry system. The slurry system is preferred because of economics. However, control of molecular weight through variation in temperature is severely limited in slurry systems because the increase in temperature necessary to produce lower molecular weight (higher melt flow) material results in the polymer going into solution thus destroying the slurry process.

It has long been known broadly to use orthophosphates as supports for chromium olefin polymerization catalysts and recently improved techniques for producing aluminum phosphate catalysts have been developed which are more sensitive to molecular weight control agents. Polyphosphates such as pyrophosphates have by implication been considered inoperable in that the prior art in dealing with aluminum phosphate supports generally indicates that a phosphorus to aluminum ratio of greater than 1 is not desirable.

SUMMARY OF THE INVENTION

It is an object of this invention to produce an outstanding support for a chromium catalyst utilizing a polyphosphate of polyphosphoric acid;

It is a further object of this invention to provide a catalyst system having unusual sensitivity to molecular weight control agents such as hydrogen; and It is yet a further object of this invention to provide an improved catalyst system for use in slurry polymerization systems.

In accordance with one embodiment of this invention a support for zerovalent chromium compound is produced by calcining an aluminum polyphosphate. In accordance with another embodiment of this invention alumina is impregnated with a polyphosphoric acid, calcined and used as a support for a chromium catalyst.

DESCRIPTION OF THE PREFERRED EMBODIMENTS

In the first embodiment, the source of polyphosphate ions and the source of aluminum ions (or an aluminum alkoxide) are combined to give an aluminum polyphosphate. For instance, sodium pyrophosphate and aluminum nitrate can be combined in methanol to form an aluminum pyrophosphate precipitate, e.g. $AlHP_2O_7$, $Al_4(P_2O_7)_3$. Alternatively, a mixture of polyphosphoric acid and an aluminum salt can be combined and neutralized to give the aluminum polyphosphate. While pyrophosphoric acid ($H_4P_2O_7$) or a salt as the sodium salt of pyrophosphoric acid can be used, generally a mixture of acids is utilized. For instance, phosphorous pentoxide can be partially hydrolyzed in an aprotic solvent to give a mixture of orthophosphoric acid, pyrophosphoric acid, triphosphoric acid, tetraphosphoric acid, and pentaphosphoric acid. A suitable solvent is methyl cyanide. In any event the support is made using a composition which is predominantly (greater than 50 mole percent) polyphosphoric acid. The alkyl of the aluminum alkoxide can be a 1–6 carbon atom group but is preferably aluminum isopropoxide.

In accordance with this invention the phosphorus to aluminum atom ratio can vary widely but generally will be in the range of 0.2 to 2. The phosphorus to aluminum ratio is varied in two ways. First, obviously if a greater amount of tri-, tetra-, or pentaphosphoric acid is present than pyrophosphoric acid, for example, the phosphorus to aluminum ratio will be higher than if predominantly pyrophosphoric acid is used. Second, more than a stoichiometric amount of aluminum salt can be used to form $AlHP_2O_7$, for instance, so that with pyrophosphoric acid a phosphorus to aluminum ratio of 0.2 can be obtained rather than 2. Similarly, for instance, a phosphorus to aluminum ratio of 2 can be obtained either by using a stoichiometric amount of pyrophosphate salt and aluminum salt or by using more than a stoichiometric amount of the aluminum salt with tri- or tetraphosphate salt.

Compositions with a P/Al ratio below 2 are not mixtures of aluminum polyphosphate and alumina but rather are of a unitary matrix structure where phosphate entities are replaced with alumina entities.

The aluminum polyphosphate is activated prior to incorporation of the zerovalent chromium compound. The primary purpose of this activation is simply to achieve complete dryness and therefore any dry atmosphere can be utilized, either inert or oxidizing. Nitrogen, for instance, is suitable as is air. Temperatures can be lower than those generally used for activating silica based chromium catalysts. Broadly, temperatures of 150° to 800° C., preferably 300 to 700 and times of one minute to 48 hours, preferably 0.5 to 10 hours are suitable. After the activation, the support must be protected from water and therefore the zerovalent chromium must be added anhydrously as for instance through the use of an anhydrous solvent such as a hydrocarbon.

Suitable zerovalent chromium compounds are disclosed in U.S. Pat. No. 4,364,841 Dec. 21, 1982, the disclosure of which is hereby incorporated by reference). The zerovalent chromium compound can be any zerovalent chromium compound known in the art. These compounds are frequently referred to as π-bonded organochromium compounds. Preferred zerovalent chromium compounds are substituted or unsubstituted diarene chromium compounds having 1 to 6 carbon atom alkyl radicals when substituted. Dicumene chromium is a preferred material.

In the second embodiment, alumina is impregnated with a polyphosphoric acid. This can be either pyrophosphoric acid or more generally a mixture of phosphoric acids including a major portion of polyphosphoric acid as described hereinabove.

Generally, the alumina will be activated in conventional manner for instance by heating as described hereinabove before incorporating the polyphosphoric acid. After the polyphosphoric acid composition has been introduced and the solvent, if any, used to carry the polyphosphoric acid composition has been evaporated, the support now containing the polyphosphoric acid can be activated by heating in the same manner as described hereinabove for activating the polyphosphate.

Thereafter, a zerovalent chromium of the type described hereinabove can be incorporated in the same manner as was done with the aluminum polyphosphate as described hereinabove. The resulting product can then be used as a catalyst.

Alternatively, when the polyphosphoric acid composition is used to impregnate alumina, the resulting composition containing chromium can be calcined to give an active chromium oxide catalyst. The chromium source can be the same as that conventionally used in chromium olefin catalyst systems such as chromium acetate, chromium nitrate, chromium oxide, tert-butylchromate or other chromium compounds convertible to the oxide or calcination. These can be added aqueously or anhydrously except that if added aqueously the composition must be dried prior to addition of the polyphosphoric acid. In this embodiment the alumina can be activated prior to incorporation of the polyphosphoric acid as described hereinabove or the activation can be omitted. Generally it will be activated because it is undesirable to have water present when the alumina is combined with the polyphosphate. Chromium can be included with the polyphosphoric acid composition or chromium can be added after the alumina is impregnated but in either event the chromium must be added anhydrously.

At this point is should be noted that the polyphosphoric acid itself is anhydrous by definition. That is, polyphosphoric acid can be produced by combining $P_2O_5$ with water, but in an amount insufficient to give orthophosphoric acid. This produces a mixture of ortho-, pyro-, tri-, tetra- and penta-phosphoric acid. Pure pyrophosphoric acid is produced by removing one mole of water from two moles of orthophosphoric acid. Water then must be avoided unless the ortho- form is desired since any of the polyphosphate forms go to ortho on addition of sufficient water. As used herein the terms "polyphosphoric acid" or "polyphosphate" are meant to be generic to any of the above described compositions with insufficient water to give a composition which is predominently in the ortho-configuration.

The resulting chromium containing polyphosphoric acid impregnated alumina is then activated in an oxygen containing ambient such as air at a temperature of 150° to 800° C., preferably 250° to 600° C. for a time of one minute to 24 hours, generally 0.5 to 10 hours.

Suitable alumina is high porosity gamma-alumina. By high porosity is meant between 1 and 4, preferably 1.5 to 2.5 cc/g pore volume measured by liquid adsorption.

One potential source of the chromium is simply the zerovalent chromium used in the first part of this second embodiment. That is the zerovalent chromium impregnated activated alumina can then be used directly as a catalyst or can be calcined to give a chromium oxide catalyst which is also active.

The chromium compounds are used in amount sufficient to give 0.001 to 10, preferably 0.1 to 5, more preferably about 1 weight percent chromium based on the weight of the dried support plus chromium compound.

In this second embodiment, the phosphorus to alumina ratio is generally quite low because of the large amount of aluminum present in the alumina. The phosphorus component is added in an amount to give 0.1 to 20, preferably 1 to 10 mole percent of the phosphorus compound incorporated based on the moles of alumina.

If desired an organoaluminum or organoboron catalyst can be used. Preferably the cocatalyst is omitted in the case of zerovalent chromium but is used in the case of the oxidized chromium. Preferably the cocatalyst is a trihydrocarbylborane as disclosed in said U.S. Pat. No. 4,364,842, most preferably, triethylborane.

The cocatalyst is used in an amount so as to give an atom ratio of metal such as boron or aluminum to chromium within the range of 0.1:1 to 10:1 preferably 0.5:1 to 5:1.

The cocatalyst when used can be either premixed with the catalyst or added as a separate stream to the polymerization zone, the latter being preferred.

The catalyst of this invention can be further treated in the same manner as chromium on silica catalysts are sometimes given special treatments such as being fluorided or being reduced and being reoxidized by, for instance, high temperature treatment in carbon monoxide followed by activation as described herein in an oxidizing ambient.

The catalyst of this invention can be used to polymerize at least one mono-1-olefin containing 2 to 8 carbon atoms per molecule. The invention is of particular applicability in producing ethylene homopolymers and copolymers from mixtures of ethylene and one or more comonomers selected from 1-olefins containing from 3 to 8 carbon atoms per molecule. Exemplary comonomers for use with ethylene include aliphatic 1-olefins, such as propylene, 1-butene, 1-pentene, 1-hexene, 1-octene, and other higher olefins and conjugated or nonconjugated diolefins such as 1,3-butadiene. Ethylene copolymers preferably constitute about 90 preferably 96 to 99.7 weight percent polymerized ethylene units and 0.3 to 4.0 weight percent comonomer. Propylene, 1-butylene, 1-pentene, 1-hexene, and 1-octene are especially preferred comonomers.

The polymers can be prepared from the catalyst of this invention by solution polymerization, and gas phase polymerization techniques using conventional equipment and contacting processes, however the primary purpose of the invention is to provide a superior slurry polymerization catalyst. In this method the catalyst can be suspended in an organic medium and the mixture agitated to maintain the catalyst in suspension throughout the polymerization process.

The catalysts of this invention are particularly suitable for use in slurry polymerization systems to produce a complete spectrum of polymers so far as melt flow is concerned by utilizing a single catalyst with a molecular weight control agent such as hydrogen. While hydrogen is known as a molecular weight control agent in the prior art, and is known to be particularly effective with certain phosphate based catalyst systems, the catalyst system of this invention is extraordinarily sensitive to the effects of hydrogen.

The slurry polymerization of ethylene and predominantly ethylene copolymer systems at a temperature range of about 200° to 230° F. (93° to 110° C.) can be used.

The catalysts of this invention have the further advantage of generally not having any noticeable induction time between initial contact with the monomer and the initiation of polymerization if the activation temperature is high enough.

The hydrogen is used in an amount within the range of 0.1 to 1 preferably 0.03 to 0.5 mole percent based on diluent.

EXAMPLE 1

An aluminum pyrophosphate having an atom ratio of P/Al of 1.5 was made from sodium pyrophosphate and aluminum nitrate in methanol. It was then calcined at 300° C. in air and impregnated with 1 weight percent chromium as dicumene chromium (0) in pentane, and the solvent evaporated. The catalyst properties were as follows. The surface area (SA) was 91 m$^2$/g as determined by the BET method; N$_2$ pore volume (PV) was found to be 0.30 cc/g (saturated); 0.19 cc/g (desorbed); and 0.23 cc/g (adsorption).

It was tested for ethylene polymerization at 205° F. and 565 psia total pressure using 0.2473 grams of catalyst charged to the reactor with the following results:

| Run 1 | |
|---|---|
| Induction time | 22 minutes |
| Run time | 60 minutes |
| Polyethylene produced | 141 grams |
| Productivity | 570 g polymer/g supported catalyst |

Polymer properties were as follows:

| | |
|---|---|
| Melt index (MI), g/10 min[a] | 0 |
| High load MI (HLMI), g/10 min[b] | 8.5 |
| Density, g/cc[c] | 0.9491 |
| Flexural modulus, MPa[d] | 873 |
| $M_w$, GPC | 146,000 |
| $M_n$, GPC | 3,100 |
| $M_w/M_n$ | 47 |
| Terminal vinyl groups[e] | 3.3/1000 carbons |
| Methyl groups[e] | 6.9/1000 carbons. |

[a]ASTM D-1238, Condition E
[b]ASTM D-1238, Condition F
[c]ASTM D-1505
[d]ASTM D-790
[e]From infrared spectra Gel permeation chromatography (GPC) showed a bimodal molecular weight distribution.

In another run at 205° F., 565 psia total pressure, 50 psi being H$_2$, and 0.3911 gram catalyst was charged to the reactor with the following results:

| Run 2 | |
|---|---|
| Induction time | 30 minutes |
| Run time | 60 minutes |
| Polymer recovered | 113 grams |
| Productivity | 289 g/g |
| Density, g/cc | 0.9445 |
| Terminal vinyl groups | 4.9/1000 carbons |
| Methyl groups | 10.9/1000 carbons |
| Melt index, g/10 min | >6000 (wax) |

The results shown in Runs 1 and 2 indicate that the catalyst is relatively active in ethylene polymerization based on the productivity values of about 290–570 g polyethylene per g supported catalyst that were obtained considering that the support was activated (calcined) at a low temperature (300° C.). At higher calcining temperatures, e.g. 500° C., more active supported chromium catalysts are usually made, as noted in Example II.

The catalyst is extraordinarily responsive to the presence of hydrogen during polymerization as shown by the melt index results. In Run 1, no hydrogen, a zero melt index polymer was made whereas in Run 2, only 50 psi hydrogen present, as low molecular weight polymer of greater than 6000 melt index (a wax) was made. Another unusual feature of the catalyst is shown by the high $M_w/M_n$ value of 47 for the polymer made in Run 1. This value indicates that an extremely broad molecular weight distribution polymer (bimodal) was formed.

Generally, related supported chromium catalysts produce polymer having a $M_w/M_n$ of about 20 or lower.

The remaining physical properties shown are generally similar to those obtained with catalysts comprising chromium supported on aluminum orthophosphate or alumina phosphated with orthophosphoric acid.

EXAMPLE II

To 500 ml of CH$_3$CN was added 22 ml water and 78 g of phosphorous pentoxide. The composition has been reported to contain:

~30% Orthophosphoric acid (H$_3$PO$_4$)
48% Pyrophosphoric acid (H$_4$P$_2$O$_7$)
16% Triphosphoric acid (H$_5$P$_3$O$_7$)
5% Tetraphosphoric acid (H$_6$P$_4$O$_7$)
1% Pentaphosphoric acid (H$_7$P$_5$O$_7$)

A very small amount of $H_{n+2}P_nO_{n+1}$ where n is 6 or greater may also be present. The mixture was stirred overnight to form a clear solution. CH$_3$CN was chosen as the solvent because it is polar but cannot protonate (hydrolyze) the pyrophosphoric acid.

Next 8.2 g of Davison HPV alumina (PV of 2.7; SA of 530 m$^2$/g cc measured by BET) calcined at 600° C. was impregnated with 15.3 mls of the above solution, giving a support having a P/Al atom ratio of 0.2 After the solvent had been evaporated, the support was calcined in N$_2$ at 300° C. It was then impregnated with 1 percent Cr as dicumene Cr(0) to give a yellow catalyst.

This catalyst was tested for ethylene polymerization activity twice. In Run 3 at 95° C. it produced 1280 g polyethylene/g catalyst in 30 minutes, the polymer having a MI of <0.01 and an HLMI of 5.7. In Run 4, 20 psi of H$_2$ was added, giving a MI of 2.9 and an HLMI of 266, with an HLMI/MI of 92. Thus the catalyst had a very high sensitivity to H$_2$. Productivity was 1170 g/g-30 minutes.

The catalyst was then calcined at 300° C. for two hours in dry air to oxidize the Cr. A brown catalyst resulted. In Run 5 it made 127 g/g-18 minutes of polyethylene having a MI of 0.094 and an HLMI of 20.1, HLMI/MI of 214.

The above catalyst was again calcined in air, this time at 500° C. to further oxidize the Cr. This catalyst was brown-orange. In Run 6 it yielded 1614 g/g-30 minutes. The polymer had a somewhat narrower molecular weight distribution than is typically found with orthophosphate/chromium catalysts, with a MI of 0.35 and an HLMI of 28, e.g. HLMI/MI of 80.

Runs 5 and 6 are particularly impressive because heretofore pyrophosphate had not been considered a suitable support for hexavalent chromium.

Control 1

The aluminum pyrophosphate support of Example I containing zerovalent chromium catalyst was oxidized in oxygen at 300° C. to form hexavalent chromium and tested in an ethylene polymerization run and it showed no activity.

Control 2

Aluminum orthophosphate with a phosphorus-:aluminum atom ratio of 0.8 was used as a support for chromium oxide and gave polymer with a 15 HLMI with no hydrogen and a density of 0.951 g/cc. When hydrogen was used a regular MI of 27 was obtained for the polymer, i.e. a much lower increase in melt flow than demonstrated above in Runs 1 and 2 (HLMI of 8.5 to MI of >6000) and polymer density was 0.952 g/cc.

These controls are consistent with teachings in the prior art that pyrophosphates are not suitable for supports for chromium olefin polymerization catalysts. However, the invention runs show, surprisingly, that: (1) pyrophosphates with zerovalent chromium and (2) alumina containing polyphosphoric acids with hexavalent chromium, form active ethylene polymerization catalysts. Under conditions where the pyrophosphates and other polyphosphates are operable as supports for chromium, the catalysts demonstrate a remarkable sensitivity to hydrogen which is of commercial significance. In this regard, it is to be noted that Control 2 which shows a substantial increase in polymer melt flow (although nothing like that obtained herein) represents a new development in phosphate catalyst technology which in itself is far superior so far as sensitivity to hydrogen is concerned than previous prior art chromium on silica or chromium on aluminum orthophosphate catalyst systems.

While this invention has been described in detail for the purpose of illustration it is not to be construed as limited but is intended to cover all changes and modifications within the spirit and scope thereof.

We claim:

1. A polymerization process comprising contacting at least one mono-1-olefin containing 2 to 8 carbon atoms per molecule under polymerization conditions with the catalyst comprising:
   a zerovalent organochromium compound on a predominantly aluminum polyphosphate support said zerovalent organochromium compound being present in an amount sufficient to give 0.001 to 10 weight percent chromium based on the weight of said support plus said chromium compound.

2. A process according to claim 1 wherein said mono-1-olefin is ethylene.

3. A process according to claim 1 wherein said at least one mono-1-olefin comprises ethylene and a comonomer selected from propylene, 1-butene, 1-pentene, 1-hexene, and 1-octene.

4. A process according to claim 1 wherein said polymerization is carried out under slurry conditions.

5. A process according to claim 1 wherein said aluminum polyphosphate has a phosphorus to aluminum atom ratio within the range of 0.2 to 2, said organochromium compound being present in an amount sufficient to give 0.1 to 5 weight percent chromium based on the weight of said support plus said chromium compound.

6. A process according to claim 1 wherein said aluminum polyphosphate is a mixture comprising aluminum orthophosphate, aluminum pyrophosphate, aluminum triphosphate, aluminum tetraphosphate, and aluminum pentaphosphate, said chromium compound being present in an amount sufficient to give 0.1 to 5 weight percent chromium based on the weight of said support plus said chromium compound.

7. A process according to claim 1 wherein said zerovalent organochromium compound is a substituted or unsubstituted diarene chromium compound, said chromium compound being present in an amount sufficient to give 0.1 to 5 percent chromium based on the weight of said support plus said organochromium compound.

8. A process according to claim 7 wherein said organochromium compound is dicumene chromium.

9. A process according to claim 1 wherein said catalyst is used in conjunction with an organoaluminum or organoboron cocatalyst in an amount so as to give an atom ratio of aluminum or boron to chromium within the range of 0.1:1 to 10:1, said catalyst being further characterized by having said organochromium compound present in an amount sufficient to give 0.1 to 5 weight percent chromium based on the weight of said support plus said organochromium compound.

10. A process according to claim 9 wherein said cocatalyst is triethylborane.

11. A process according to claim 1 wherein said catalyst consists essentially of said organochromium compound and said aluminum polyphosphate, said organochromium compound being present in an amount sufficient to give 0.1 to 5 weight percent chromium based on the weight of said support plus said organochromium compound.

12. A process according to claim 1 wherein said aluminum polyphosphate has an atom ratio of phosphorus to aluminum within the range of 0.2 to 2, said aluminum polyphosphate is a mixture comprising aluminum orthophosphate, aluminum pyrophosphate, aluminum triphosphate, aluminum tetraphosphate, and aluminum pentaphosphate, and wherein said organochromium compound is dicumene chromium, said organochromium compound being present in an amount sufficient to give 0.1 to 5 weight percent chromium based on the weight of said support plus said organochromium compound.

* * * * *